A. H. ZORGER.
CORN SLICER.
APPLICATION FILED FEB. 29, 1916.

1,213,056.

Patented Jan. 16, 1917.
2 SHEETS—SHEET 1.

Witnesses
Frederick W. Ely
S. C. Wilcox

Inventor
Adam H. Zorger,
By Victor J. Evans
Attorney

A. H. ZORGER.
CORN SLICER.
APPLICATION FILED FEB. 29, 1916.

1,213,056.   Patented Jan. 16, 1917.
2 SHEETS—SHEET 2.

Witnesses
Fredrick W. Ely
I. C. Wilcox

Inventor
Adam H. Zorger
By Victor J. Evans
Attorney

UNITED STATES PATENT OFFICE.

ADAM H. ZORGER, OF SHERMANS DALE, PENNSYLVANIA.

CORN-SLICER.

1,213,056.

Specification of Letters Patent.

Patented Jan. 16, 1917.

Application filed February 29, 1916. Serial No. 81,239.

*To all whom it may concern:*

Be it known that I, ADAM H. ZORGER, a citizen of the United States, residing at Shermans Dale, in the county of Perry and State of Pennsylvania, have invented new and useful Improvements in Corn-Slicers, of which the following is a specification.

This invention relates to corn slicers and it consists in the novel features hereinafter described and claimed.

An object of the invention is to provide a machine of the character indicated which is of simple and durable structure and which may be readily used for quickly reducing ears of corn to slices or sections of desired lengths for the purpose of feeding the same to stock or for any other use.

With this object in view the machine includes a frame having a hopper mounted thereon, there being provided in the upper portion of the hopper a spring pressed plate or valve adapted to bear against the corn and normally hold the same toward the forward portion of the hopper. A vertically adjustable block is mounted upon the frame below the outlet of the hopper and a knife is mounted for reciprocation at or about the lower edge of the hopper. A spring pressed follower is located below the knife and is adapted to remove any particles of grain or cob from the cutting edge of the knife during the cutting operation.

A suitable crank mechanism is provided and mounted upon the frame for reciprocating the knife.

Figure 1:
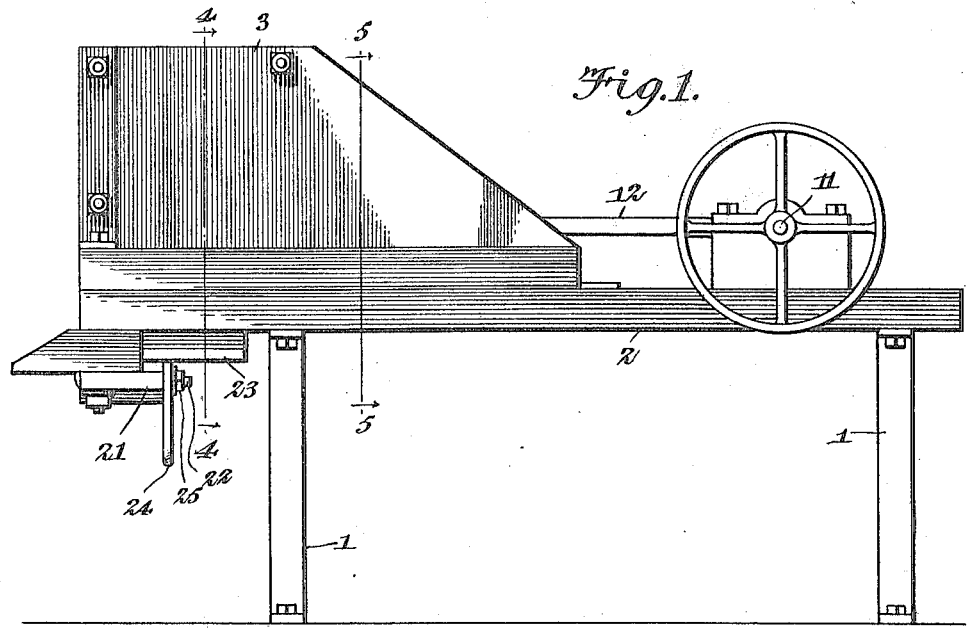
Figure 2:
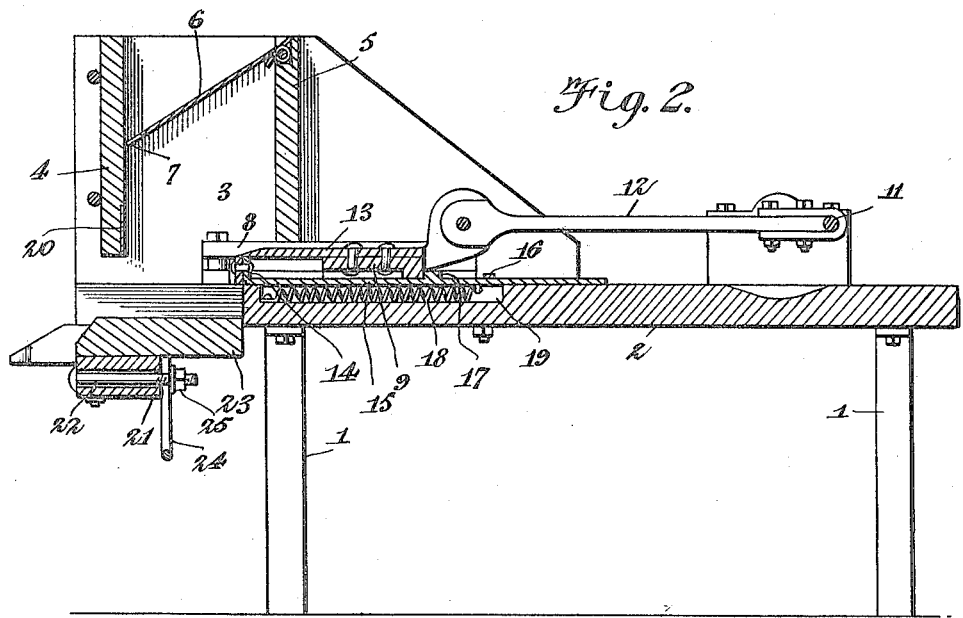
Figure 3:
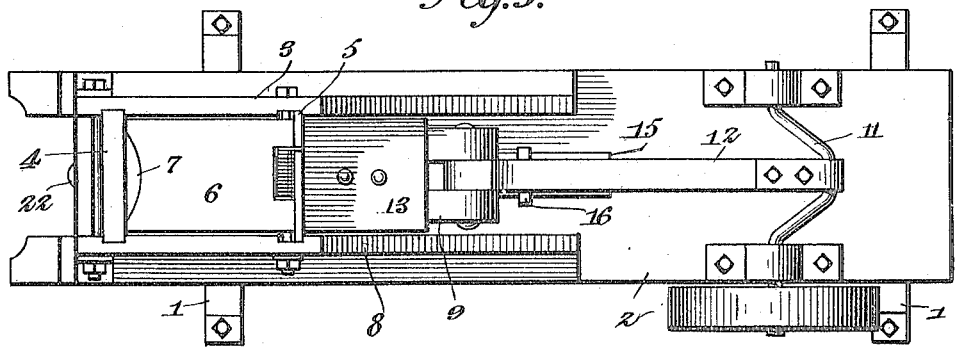
Figure 4:
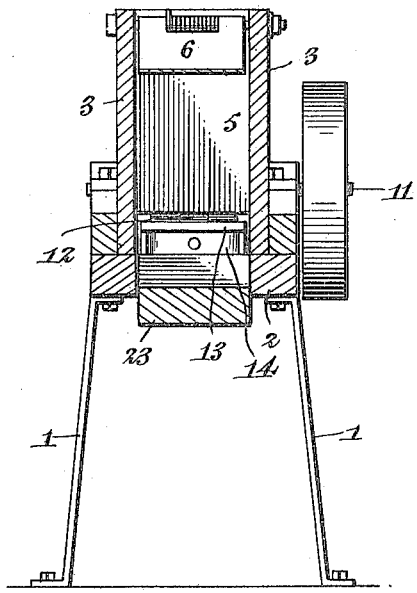
Figure 5:
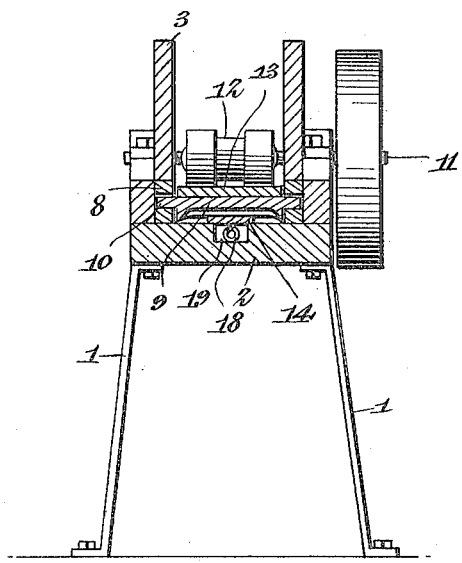

In the accompanying drawing:—Figure 1 is a side elevation of the corn slicer. Fig. 2 is a vertical longitudinal sectional view of the same. Fig. 3 is a top plan view of the same. Fig. 4 is a transverse sectional view of the same taken on the line 4—4 of Fig. 1. Fig. 5 is a similar view taken on the line 5—5 of Fig. 1.

The corn slicer includes a frame which consists of standards 1 adapted to be mounted upon a floor or other suitable base and a platform 2 supported at the upper edge of the said standards. A hopper 3 is mounted upon the end portion of the platform 2 and may be made from any suitable material as for instance wood or metal. The said hopper includes a front wall 4 and a rear wall 5, these walls being spaced from each other and vertically disposed with relation to the plane of the platform 2. A spring pressed plate or valve 6 is hingedly mounted upon the rear wall 5 of the hopper and the spring which bears against the said plate normally holds the same in an inclined position as best shown in Fig. 2 of the drawing with the free edge of the plate against the inner surface of the front wall 4 of the hopper. The said plate at its lower edge is recessed as at 7. Guides 8 are mounted just above the upper surface of the platform 2 and at the sides of the hopper 3 and a carriage 9 is provided at its side edges with outstanding flanges 10 which are slidably received in the guides 8. The said carriage 9 is mounted for movement in a plane parallel with the plane of the upper surface of the platform 2 and in a plane at a right angle to the vertical height of the hopper 6.

A crank shaft 11 is journaled for rotation in suitable bearings provided upon the platform 2 and any suitable means may be provided for rotating the said crank shaft. As illustrated in the drawing it will be seen that a belt wheel is applied to the crank shaft but if desired the said belt wheel may serve as a fly wheel and a hand crank handle may be applied to the shaft 11 for turning the same. A pitman 12 is pivoted at one end upon the crank of the shaft 11 and the said pitman at its other end is pivotally connected with the inner or rear portion of the carriage 9. A blade 13 is mounted upon the upper surface of the carriage 9 and is adapted to move between the guides 8 and across the lower portion or outlet end of the hopper 3. A follower 14 is movably mounted below the cutting edge of the blade 13 and the said follower is extended rearwardly in the form of a shank 15 which is slidably received between pins 16 mounted upon the platform 2. The said shank 15 extends along the medial longitudinal dimension of the platform 2 and is provided at its upper side with a lug 17 which engages against the rear edge of the carriage 9 as best shown in Fig. 2 of the drawing. A traction spring 18 is located in a recess 19 provided in the upper portion of the platform 2 below the shank 15. One end of the spring 18 is connected with the shank 15 and the other end of the said spring is connected with the platform 2. The tension of the spring 18 is such as to normally hold the follower 14 under or toward the cutting edge of the blade 13. A plate 20 of relatively hard material is mounted at the lower inner portion of the front wall 4 of the hopper and the knife blade 13 during its reciprocatory movement is moved toward and away from the said plate and the corn which is deposited in the hopper is sliced by the knife by pressing the same against the plate 20.

A cross bar 21 is supported from the platform 2 below the lower end of the hopper 3 and is provided with an opening which receives a bolt 22. A block 23 is mounted for vertical adjustment above the bar 21 and carries at its lower side a U-shaped yoke 24 which receives the bolt 22. A nut 25 is screw-threaded upon the end of the bolt 22 and when tightened holds the yoke 24 at an adjusted position with relation to the said bolt.

In operation the slicer works as follows:— The block 23 is adjusted to a desired position below the lower end of the front wall 4 of the hopper and the ear corn is placed in or permitted to enter the upper portion of the hopper above the plate 6. As the corn comes in contact with the said plate the free edge portion of the plate is swung in a downward direction under the weight of the corn and inasmuch as the corn slips or brushes along the free edge of the plate 6 at the recess 7 thereof the said plate and recess has a tendency to permit the corn to gravitate along the inner surface of the wall 4 so that one end of the ear rests upon the upper surface of the block 23. In the meantime the shaft 11 is rotated and through the pitman 12 the carriage 9 and the knife 13 are reciprocated. As the cutting edge of the blade 13 approaches the front wall 4 or the plate 20 carried at the lower portion thereof the said edge encounters the ears of corn and the said ears are reduced into sections. During the cutting action the portions of the ears which are below the blade 13 are encountered by the follower 14 and the said follower is moved rearwardly with relation to the cutting edge of the blade 13 and against the tension of the spring 18. When the blade 13 begins to move away from the front wall 4 of the hopper the follower 14 is held approximately at a stationary position under the influence of the spring 18 and any chips or particles of the corn which might have a tendency to adhere to the cutting edge of the blade 13 are wiped therefrom as the cutting edge of the blade 13 moves back and assumes its normal position above the follower 14. As soon as the rear edge of the carriage 9 comes in contact with the lug 17 the shank 15 and follower 14 are moved rearwardly with the carriage and the blade mounted thereon and the sections of corn which have been reduced to such a size that they may gravitate through the space between the lower edge of the front wall 4 of the hopper and the upper surface of the block 3 pass out through the said space and other ears fall down and assume positions preparatory to being reduced to sections upon the next approaching movement of the blade 13.

From the foregoing description taken in conjunction with the accompanying drawing it will be seen that a corn slicer of simple and durable structural arrangement is provided and that the same may be economically and conveniently used for reducing ears of corn to sections of proper or desired sizes. The corn after it has been sliced into sections may be used for feeding stock or for any other desired purpose.

Having described the invention what is claimed.

A corn slicer comprising a platform, a hopper mounted thereon, a block supported from the platform and located below the outlet of the hopper, a carriage mounted for reciprocatory movement upon the platform, means for moving the carriage, a blade mounted upon the carriage, a follower slidably mounted upon the platform and normally lying below the cutting edge of the blade, said follower having a shank provided with an upstanding lug adapted to be encountered by the carriage when the same moves in a direction away from the hopper and a spring connected with the shank and the platform and being under tension with a tendency to normally hold the lug toward the adjacent edge of the carriage.

In testimony whereof I affix my signature in presence of two witnesses.

ADAM H. ZORGER.

Witnesses:
 JOHN C. MOTTER,
 JACOB ZORGER.

Copies of this patent may be obtained for five cents each, by addressing the "Commissioner of Patents, Washington, D. C."